(12) United States Patent
Usui et al.

(10) Patent No.: US 9,986,457 B2
(45) Date of Patent: May 29, 2018

(54) MOBILE TERMINAL DEVICE, WIRELESS COMMUNICATION METHOD FOR MOBILE TERMINAL DEVICE, CARRIER SERVER DEVICE, AND COMMUNICATION SPEED CONTROL METHOD IN CARRIER SERVER DEVICE

(71) Applicant: SONY CORPORATION, Tokyo (JP)

(72) Inventors: Takashi Usui, Tokyo (JP); Shinichiro Tsuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 199 days.

(21) Appl. No.: 14/901,691

(22) PCT Filed: Jun. 16, 2014

(86) PCT No.: PCT/JP2014/065948
§ 371 (c)(1),
(2) Date: Dec. 28, 2015

(87) PCT Pub. No.: WO2014/208389
PCT Pub. Date: Dec. 31, 2014

(65) Prior Publication Data
US 2016/0373954 A1 Dec. 22, 2016

(30) Foreign Application Priority Data

Jun. 27, 2013 (JP) ................................. 2013-135636

(51) Int. Cl.
*H04W 28/02* (2009.01)
*H04W 72/04* (2009.01)
(Continued)

(52) U.S. Cl.
CPC ....... *H04W 28/0231* (2013.01); *H04L 47/263* (2013.01); *H04W 72/0453* (2013.01); *H04W 72/082* (2013.01); *H04W 28/18* (2013.01)

(58) Field of Classification Search
None
See application file for complete search history.

(56) References Cited

U.S. PATENT DOCUMENTS 6,185,414 B1 * 2/2001 Brunner ................ H04M 15/49
455/406
6,757,245 B1 * 6/2004 Kuusinen .............. H04W 28/18
370/230

(Continued)

FOREIGN PATENT DOCUMENTS

JP 2008-244923 A 10/2008
JP 2011-010267 A 1/2011
(Continued)

*Primary Examiner* — Faruk Hamza
*Assistant Examiner* — Cassandra Decker
(74) *Attorney, Agent, or Firm* — Oblon, McClelland, Maier & Neustadt, L.L.P.

(57) ABSTRACT

Excellent communication is to be enabled even in a communication environment with poor line quality.
A mobile terminal acquires communication state information indicating a state of communication with a base station, and sends this communication state information to a carrier server device through the base station. The carrier server device receives this communication state information, and, based on this communication state information, controls the communication speed of content data to be transmitted from a web server to the mobile terminal device through the base station. The carrier server device sends this content data having the controlled communication speed to the mobile terminal through the base station.

12 Claims, 10 Drawing Sheets

(51) Int. Cl.
*H04W 72/08* (2009.01)
*H04L 12/825* (2013.01)
*H04W 28/18* (2009.01)

(56) References Cited

U.S. PATENT DOCUMENTS

| | | | | |
|---|---|---|---|---|
| 8,340,678 B1* | 12/2012 | Pandey | ................ | H04W 72/04 370/468 |
| 2002/0101827 A1* | 8/2002 | Weston | ................ | H04L 1/0001 370/253 |
| 2003/0191856 A1* | 10/2003 | Lewis | ................ | H04L 12/5692 709/241 |
| 2006/0140369 A1* | 6/2006 | Altmann | ............... | H04M 15/00 379/114.13 |
| 2007/0115796 A1* | 5/2007 | Jeong | ................... | H04L 1/0026 370/203 |
| 2010/0113037 A1* | 5/2010 | Ong | ....................... | H04L 47/11 455/445 |
| 2012/0166665 A1* | 6/2012 | Martin | ................ | H04L 67/2819 709/230 |
| 2013/0016221 A1* | 1/2013 | Charbit | ................. | H04W 16/14 348/180 |
| 2013/0215813 A1* | 8/2013 | Kotecha | ................ | H04L 1/0017 370/312 |
| 2014/0105035 A1* | 4/2014 | Lam | ...................... | H04W 28/22 370/252 |
| 2014/0241161 A1* | 8/2014 | Tornkvist | .............. | H04W 24/02 370/235 |

FOREIGN PATENT DOCUMENTS

| | | |
|---|---|---|
| JP | 2012-009987 A | 1/2012 |
| JP | 2012-142946 A | 7/2012 |
| JP | 2012-235286 A | 11/2012 |
| JP | 2013-521586 A | 6/2013 |

* cited by examiner

```
PARAMETER MANAGEMENT TABLE

USER ID             :   0015
REMAINING
AMOUNT IN COUPON    :   320 MBYTES
COUPON STATUS       :   ON
```

FIG. 11
(a)
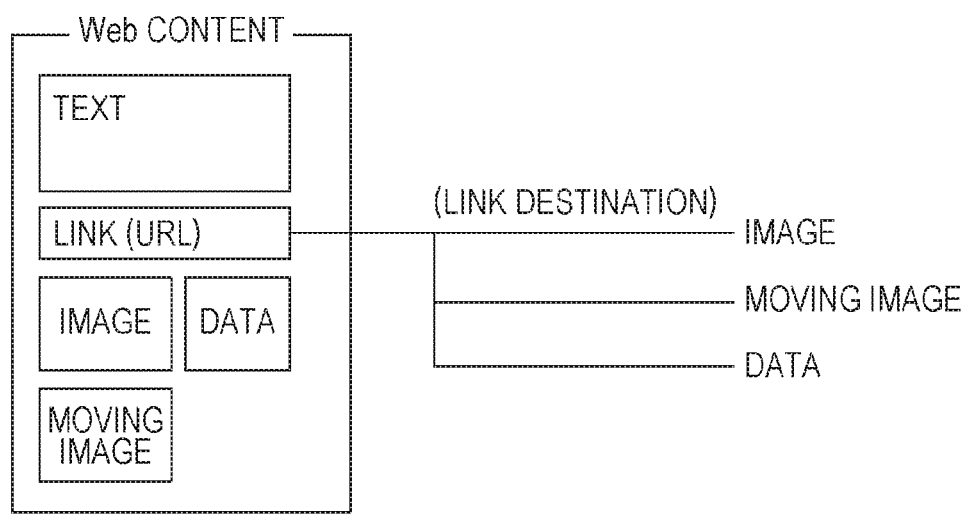
(b)
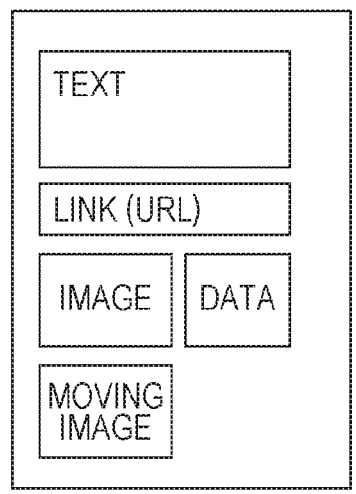
(c)
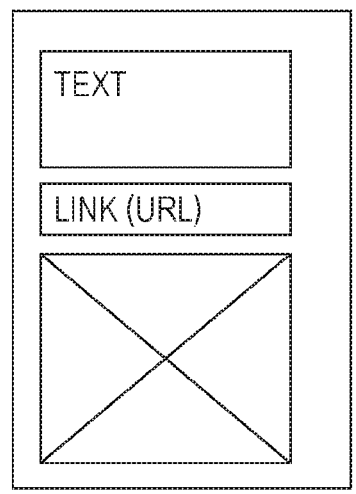

MOBILE TERMINAL DEVICE, WIRELESS COMMUNICATION METHOD FOR MOBILE TERMINAL DEVICE, CARRIER SERVER DEVICE, AND COMMUNICATION SPEED CONTROL METHOD IN CARRIER SERVER DEVICE

TECHNICAL FIELD

The present technology relates to a mobile terminal device, a wireless communication method for a mobile terminal device, a carrier server device, and a communication speed control method in a carrier server device.

BACKGROUND ART

In conventional cellular networks or Wireless Local Area Networks (WLANs), service quality is secured by controlling error rates and transmission speeds by varying control parameters in the physical layers (PHY) in accordance with the states of wireless transmission paths, or controlling retransmission and congestion through Medium Access Control (MAC). However, the control is not sufficient.

In a communication environment with poor line quality, throughput is low. For example, Patent Document 1 discloses a method of measuring or estimating line quality. In an environment with low throughput, services are preferably provided at low prices. In an environment with high throughput, services are preferably provided at high prices.

There have been systems with which speed restrictions are lifted upon payment of additional charge (with a coupon). For example, a user pays for the coupon, and manually validates the coupon on the Internet through a personal computer (PC), so that the speed restrictions are lifted.

CITATION LIST

Patent Document

Patent Document 1: JP 2011-10267 A

SUMMARY OF THE INVENTION

Problems to be Solved by the Invention

The present technology aims to enable excellent communication even in a communication environment with poor line quality.

Solutions to Problems

A concept of the present technology lies in a mobile terminal device that includes:

an information acquiring unit that acquires communication state information indicating a state of communication with a base station;

an information transmitting unit that transmits the communication state information to a carrier server device through the base station; and a data receiving unit that receives content data from a web server through the carrier server device and the base station, while a communication speed is controlled based on the communication state information.

In the present technology, the information acquiring unit acquires the communication state information indicating a state of communication with the base station. For example, the communication state information may be an estimated line speed estimated from a congestion degree and an interference wave intensity, and/or line quality information obtained by comparing the estimated line speed with a threshold value. The information transmitting unit sends the communication state information to the carrier server device through the base station. While the communication speed is controlled based on the communication state information, the data receiving unit receives content data from the web server through the carrier server device and the base station.

As described above, in the present technology, the communication state information indicating a communication state with the base station is acquired, and is transmitted to the carrier server device. Accordingly, the communication speed of the content data to be transmitted from the web server can be set in accordance with the communication state information, and excellent communication can be conducted even in a communication environment with poor line quality. That is, the wireless resource that can be allotted to other users can be increased, and line load can be reduced, for example. Also, the most basic communication environment is provided, so that a more stable system can be established, for example.

In the present technology, the mobile terminal device may further include a time-out period setting unit that sets a time-out period related to connection to the web server or downloading of the content data from the web server based on the communication state information, for example. In this case, the time-out period is shortened in an environment with poor line quality, for example, and accordingly, unnecessarily long occupation of a wireless line is prevented.

Another concept of the present technology lines in a carrier server device that include:

an information receiving unit that receives communication state information from a mobile terminal device through a base station, the communication state information indicating a state of communication with the base station; and a speed control unit that controls a communication speed at a time when content data is sent from a web server to the mobile terminal device through the base station, the communication speed being controlled based on the communication state information.

In the present technology, from the mobile terminal device through the base station, the information receiving unit receives the communication state information indicating a state of communication with this base station. For example, the communication state information may be an estimated line speed estimated from a congestion degree and an interference wave intensity, and/or line quality information obtained by comparing the estimated line speed with a threshold value.

Based on the communication state information, the speed control unit controls the communication speed at a time when content data is transmitted from the web server to the mobile terminal device through the base station. For example, the speed control unit may divide the communication state indicated by the communication state information into more than one level, and control the communication speed in accordance with the respective levels.

As described above, in the present technology, the communication speed at a time when content data is sent from the web server to the mobile terminal device through the base station is controlled based on the communication state information indicating a state of communication between the mobile terminal device and the base station. Accordingly, the communication speed of the content data to be transmitted from the web server can be set in accordance with the communication state information, and excellent communication can be conducted even in a communication environment with poor line quality. That is, the wireless resource that can be allotted to other users can be increased, and line load can be reduced, for example. Also, the most basic communication environment is provided, so that a more stable system can be established, for example.

In the present technology, the speed control unit may change the control value for the communication speed in accordance with the specifics of content, for example. Also, the speed control unit may change the control value for the communication speed in accordance with the specifics of an action of the user of the mobile terminal device, for example. With this, the mobile terminal device can acquire content data at the communication speed in accordance with the specifics of the content or the specifics of an action of the user.

In the present technology, the carrier server device may further include a data size control unit that reduces the size of the content data to be transmitted to the mobile terminal device through the base station, when the speed control unit controls the communication speed to become lower, for example. With this, the time required for transmitting content data can be shortened, and long occupation of the wireless resource can be prevented.

In the present technology, the speed control unit may also determine whether line quality is good based on the communication state information, set a coupon into a usable state and not restrict the communication speed when the line quality is good, and set the coupon into an unusable state and restrict the communication speed to a predetermined value when the line quality is not good, for example. In this case, the coupon is automatically put into the unusable state when the communication environment is degraded. Thus, a fee structure that is satisfactory to users can be provided.

Effects of the Invention

According to the present technology, excellent communication can be conducted even in a communication environment with poor line quality. That is, the wireless resource that can be allotted to other users can be increased, and line load can be reduced, for example. Also, the most basic communication environment is provided, so that a more stable system can be established, for example. The advantageous effects described in this specification are merely examples, and the advantageous effects of the present technology are not limited to them and may include additional effects.

BRIEF DESCRIPTION OF DRAWINGS

FIGS. 11($a$) to 11($c$) are diagrams for explaining a structure for enabling a data size reduction process on the side of the provider server.

MODES FOR CARRYING OUT THE INVENTION

The following is a description of a mode for carrying out the invention (the mode will be hereinafter referred to as the "embodiment"). Explanation will be made in the following order.

1. Embodiment
2. Modifications

1. Embodiment

[Example Configuration of a Mobile-Phone System]

Figure 1:
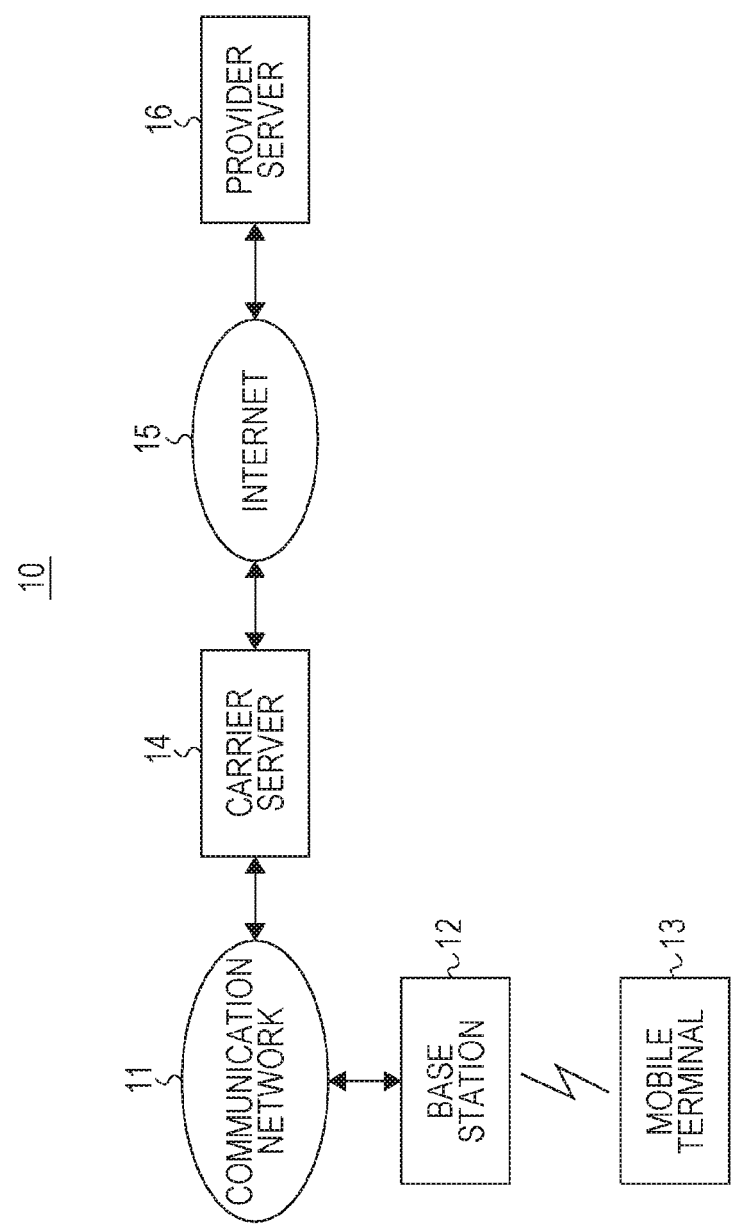
FIG. 1 is a block diagram showing an example configuration of a mobile-phone system as an embodiment.

FIG. 1 shows an example configuration of a mobile-phone system 10 as an embodiment. This mobile-phone system 10 includes: a communication network 11 of the telecommunications carrier that runs this mobile-phone system; a base station 12 of the mobile-phone system; and a mobile terminal 13 of each subscriber who subscribes to the mobile-phone system.

This mobile-phone system 10 also includes a carrier server (proxy server) 15 that controls connection between the communication network 11 and the Internet 15. A server (provider server) 16 of an Internet provider to which the user of the mobile terminal 13 subscribe is connected as a web server to the Internet 15, for example.

Figure 2:
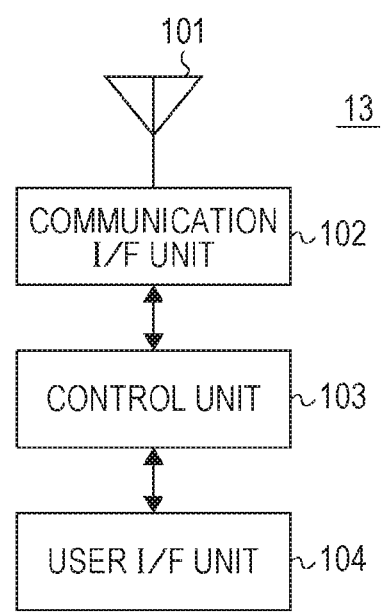
FIG. 2 is a diagram showing an example structure of a mobile terminal.

FIG. 2 shows an example structure of the mobile terminal 13. This mobile terminal 13 includes an antenna 101, a communication interface unit (communication I/F unit) 102, a control unit 103, and a user interface unit (user I/F unit) 104.

The antenna 101 receives radio waves from the base station 12, outputs the received signal to the communication I/F unit 102, and outputs a signal from the communication I/F unit 102 in the form of radio waves. The communication I/F unit 102 is an interface for conducting communication (data communication) with the base station 12, and establishes a link to the base station 12 or cuts off an established link to the base station 12.

The control unit 103 is formed with a CPU, a ROM, a RAM, and the like, and controls operation of the entire device. The user I/F unit 104 is formed with a keyboard, a tablet, an input pen, a display, or a speaker, for example, and receives an information input from the user, supplies the information input to the control unit 103, and, to the user, presents information supplied from the control unit 103.

Figure 3:
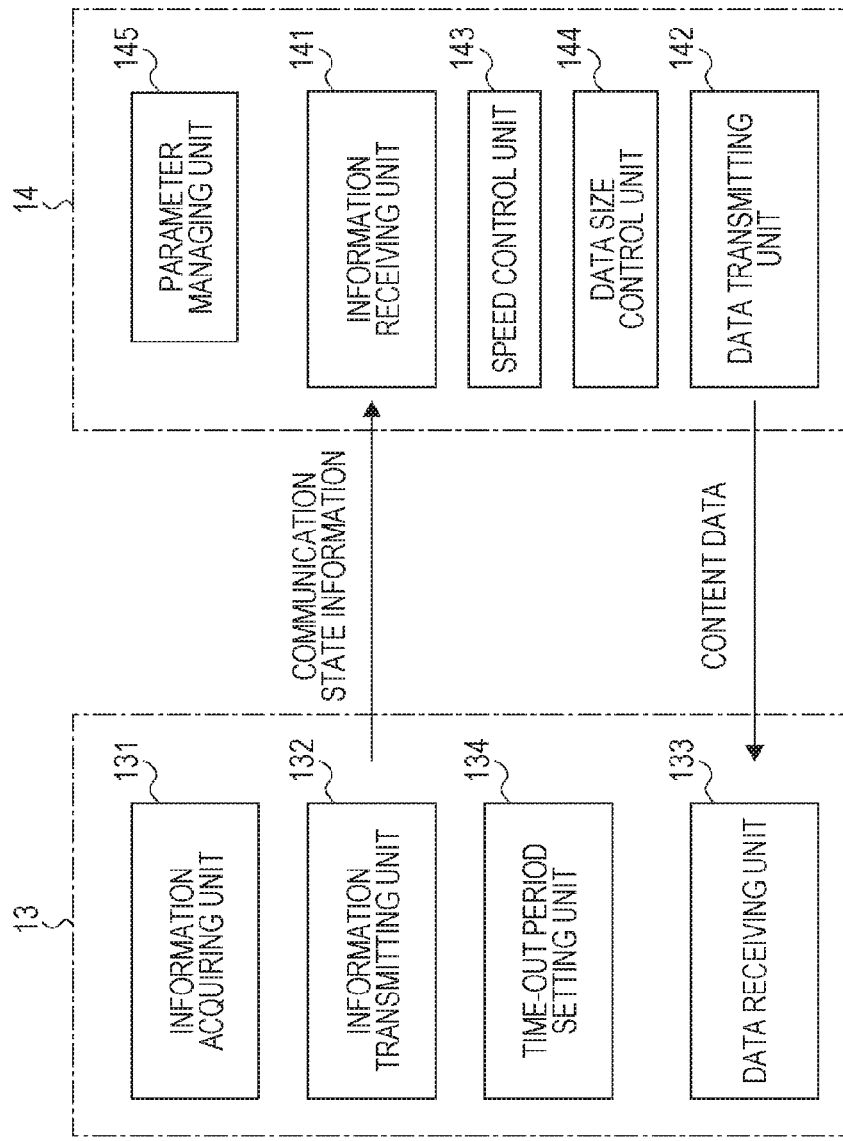
FIG. 3 is a diagram for explaining the function units at least included in the mobile terminal and the carrier server.

FIG. 3 shows the function units at least included in the mobile terminal 13 and the carrier server 14. The mobile terminal 13 includes an information acquiring unit 131, an information transmitting unit 132, a data receiving unit 133, and a time-out period setting unit 134. The information acquiring unit 131 acquires communication state information indicating a state of communication with the base station 12. In this embodiment, the communication state information may be an estimated line speed Ro estimated from a congestion degree and an interference wave intensity, and/or a line quality flag Fq obtained by comparing the estimated line speed Ro with a threshold value Rt, for example.

The estimated line speed Ro is now explained. In estimating a line speed, (1) line quality, or a signal-to-interference ratio (SIR) of a signal from the base station 12, is determined, (2) the maximum speed corresponding to this SIR is determined, and (3) an effective communication rate is determined at last.

Here, the line quality is calculated from a congestion degree and an interference wave intensity. The congestion degree is the ratio of the occupied bandwidth to the allowed bandwidth of the base station. The interference waves are signals from other base stations in the neighborhood, and are the interference waves that reach the terminal. Even where the congestion degree is low, if the interference waves are strong, the congestion degree appears to be equivalently high. The maximum speed is determined from a speed table that is specified in accordance with the line quality and the wireless system specifications, for example. The effective communication rate is calculated by applying a certain conversion formula to the maximum speed. This effective communication rate calculation is disclosed in JP 2012-9987 A, for example. The congestion degree Kcong in this publication is a congestion degree in a broad sense including interference waves, and is equivalent to line quality. Further, the SIR indicates the SIR of the reference signal (that is, SIR_CPICH), and reflects the excess bandwidth of the base station, rather than simply reflecting signal intensity. In LTE, a value called Reference Signal Received Quality (RSRQ) may also be used.

Next, the line quality flag Fq is explained. The line quality flag Fq is obtained by comparing the estimated line speed Ro with the threshold value Rt. For example, where Ro>Rt, Fq is set to "1", and "line quality is good" is displayed. Where Ro≤Rt, on the other hand, Fq is set to "0", and "line quality is not good" is displayed.

Here, the threshold value Rt is a constant value of 150 kbps, for example. Alternatively, this threshold value Rt may be determined based on a frequency distribution graph of transmission speeds used by the user. For example, in a case where the frequency distribution is polarized, the threshold value Rt is determined to be the intermediate value. Also, the threshold value Rt may be determined to be the standard deviation σ or a value a predetermined number of times larger than the standard deviation σ. Alternatively, frequency distribution graphs may be created for the respective types of content viewed by the user, and threshold values may be determined for the respective types of content. In this case, the line quality flag Fq is obtained for each of the types of content.

Instead of the two-valued line quality flag Fq, a multi-valued line quality index Iq may be used. The line quality index Iq is obtained by comparing the estimated line speed Ro with more than one threshold value Rt.

The line quality information (the line quality flag Fq or the line quality index Iq) may be incremented or decremented with the use of a database supplied from the carrier server 14, for example. This database is a database of off-line areas (poor reception areas), on-line areas (good reception areas), or crowd density information. Current location information obtained by a GPS function (not shown) of the mobile terminal 13 is transmitted to the carrier server 14, so that the carrier server 14 can recognize where the user is located, and provide an appropriate database to the mobile terminal 13.

The line quality information varies with time. If there is statistical information indicating that the line is often congested or the line quality is often poor in that area according to statistics, the statistical information can be used as previous knowledge that, even if the line quality information indicates good quality at the moment, the line quality tends to soon deteriorate. In such a location, good line quality cannot be expected to last long, and therefore, the line quality index Iq is downgraded, for example.

The information transmitting unit 132 sends the communication state information acquired by the information acquiring unit 131 to the carrier server 14 through the base station 12. While the communication speed is controlled based on the communication state information, the data receiving unit 133 receives content data from the provider server 16 through the carrier server device 14 and the base station 12.

Based on the communication state information, the time-out period setting unit 134 sets a time-out period related to connection to the provider server 16 (connection time-out period), and a time-out period related to downloading of content data from the provider server 16 (communication completion time-out period). The set value of this time-out period exists in an HTTP module in the mobile terminal 13.

If the communication state is not good in this case, the time-out period is shortened. For example, the time-out period is set at two or more, or three or more levels, so that, as the estimated line speed becomes lower, the time-out period becomes shorter. With this, the time-out period is shortened in an environment with poor line quality, and accordingly, unnecessarily long occupation of the wireless line is prevented. Such a time-out period can also be set in the carrier server 14.

Meanwhile, the carrier server 14 includes an information receiving unit 141, a data transmitting unit 142, a speed control unit 143, a data size control unit 144, and a parameter managing unit 145. From the mobile terminal 13 through the base station 12, the information receiving unit 141 receives the communication state information indicating a state of communication with this base station 12. As described above, this communication state information is the estimated line speed Ro calculated from a congestion degree and an interference wave intensity, and/or the line quality information (the line quality flag Fq or the line quality index Iq) obtained by comparing the estimated line speed Ro with the threshold value Rt. The data transmitting unit 142 transmits content data from the provider server 16 having its communication speed and data size controlled as necessary, to the mobile terminal 13 via the base station 12.

Based on the communication state information received by the information receiving unit 141, the speed control unit 143 controls the communication speed at which content data is transmitted from the provider server 16 to the mobile terminal 13 through the base station 12. The speed control unit 143 determines the line quality information (the line quality flag Fq or the line quality index Iq) from the estimated line speed Ro as the communication state information in the same manner as in the above described mobile terminal 13, and controls the communication speed based on this line quality information. Alternatively, the speed control unit 143 controls the communication speed based on the line quality information (the line quality flag Fq or the line quality index Iq) as the communication state information.

In this case, the communication speed is controlled to be set at two or more, or three or more levels. For example, the communication speed is controlled to be set at two levels depending on whether the estimated line speed Ro is higher than the threshold value Rt. In a case where the threshold value Rt is 150 kbps, for example, the speed control unit 143 restricts the communication speed to 150 kbps when Ro≤Rt and the line quality is not good, but does not restrict the communication speed when Ro>Rt and the line quality is good.

Figures 4, 5:
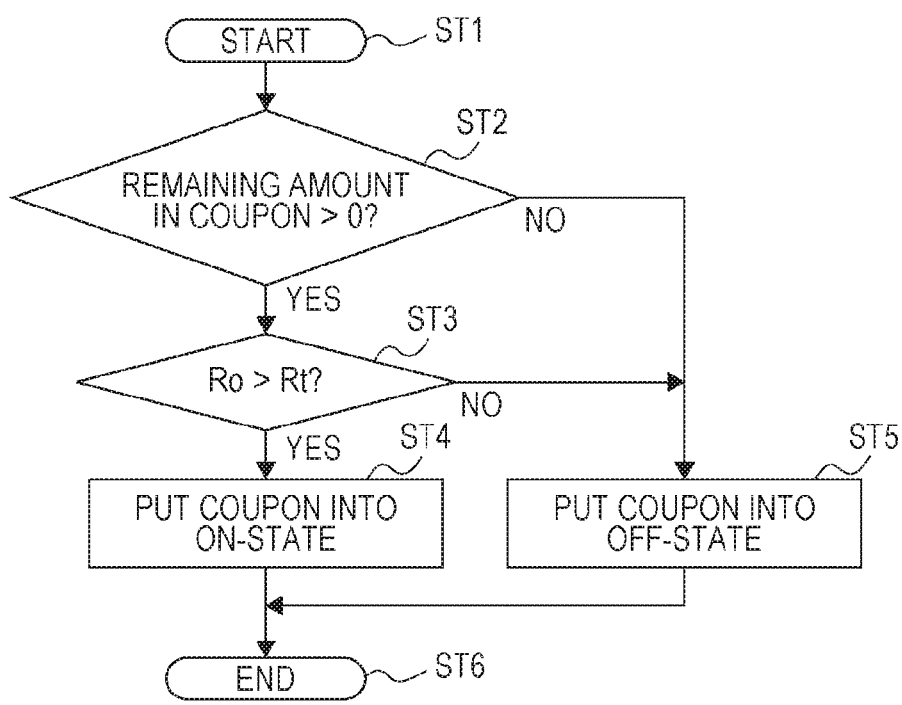
FIG. 4 is a diagram showing an example of a charge screen that is displayed on the mobile terminal when a user performs an operation to increase the remaining amount in a coupon with this mobile terminal.
FIG. 5 is a flowchart showing an example of the procedures in a process of putting the coupon into an on- or off-state.

In this case, the coupon is in an off-state (unusable state) when Ro≤Rt, and the coupon is in an on-state (usable state) when Ro>Rt. It should be noted that the coupon can be used only when there is a remaining amount in the coupon. FIG. 4 shows an example of a charge screen that is displayed on the mobile terminal 13 when the user performs an operation to increase the remaining amount in the coupon with this mobile terminal 13, for example. As the user places a check in a desired item in the check column, and presses the charge button, the remaining amount in the coupon is increased.

The flowchart in FIG. 5 shows an example of the procedures in the process of putting the coupon into an on- or off-state. In step ST1, the speed control unit 143 starts the process, and then moves on to the procedure in step ST2. In step ST2, the speed control unit 143 determines whether there is a remaining amount in the coupon.

If there is a remaining amount in the coupon, the speed control unit 143 in step ST3 determines whether Ro>Rt. If Ro>Rt, the speed control unit 143 in step ST4 puts the coupon into the on-state (usable state). In this state, the speed control unit 143 does not restrict the communication speed. After that, the speed control unit 143 in step ST6 ends the process.

If not Ro>Rt, on the other hand, the speed control unit 143 in step ST5 puts the coupon into the off-state (unusable state). In this state, the speed control unit 143 restricts the communication speed to 150 kbps. After that, the speed control unit 143 in step ST6 ends the process.

Even where the coupon is in the on-state (usable state), if all the remaining amount in the coupon is spent on usage of the line, the speed control unit 143 immediately puts the coupon into the off-state (unusable state), and restricts the communication speed to 150 kbps.

Figures 6, 7:
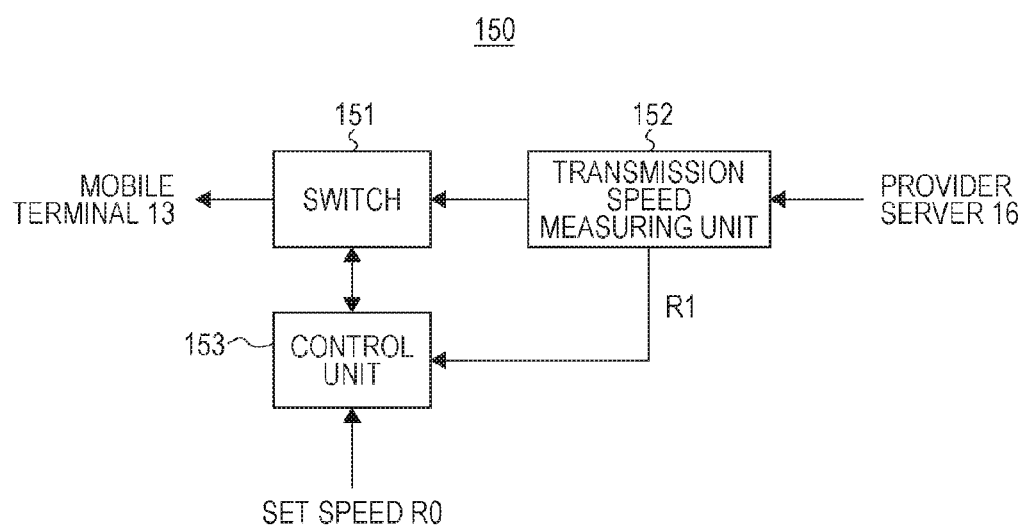
FIG. 6 is a diagram showing an example of the service parameters that are stored and managed in a parameter management table.
FIG. 7 is a diagram schematically showing an example configuration of a speed control system in the carrier server.

The parameter managing unit 145 manages the service parameters of each user, using a parameter management table. FIG. 6 shows an example of the service parameters that are stored and managed in the parameter management table. In this example, the remaining amount in the coupon and the coupon status are managed under the user ID.

FIG. 7 schematically shows an example configuration of a speed control system 150 in the carrier server 14. This speed control system 150 includes a switch 151, a transmission speed measuring unit 152, and a control unit 153. The transmission speed measuring unit 152 measures the number R1 of bytes per second in content data flowing from the provider server 16 into the mobile terminal 13, for example. The control unit 153 compares the measured number R1 of bytes with a set speed R0, and controls switching on and off of the switch 151 based on the comparison result, so that R1 becomes equal to R0.

Although the communication speed is not restricted when the coupon is in the on-state in the above description, the value of the communication speed may be restricted when the coupon is in the on-state. Although the communication speed is restricted to 150 kbps when the coupon is in the off-state in the above description, the speed value may be more finely restricted.

Normally, the set speed R0 is determined by the ratio between a content size and an expected reaction time. The content size and the expected reaction time are determined by the type of the content and the state of the user. For example, the speed control unit 143 may change the set speed R0 in accordance with the specifics of the content (content type or priority). With this, the reaction time corresponding to the content type or priority (the time until web pages become available for access) can be achieved. For example, the data size is normally small in the case of text content, and the data size is normally large in the case of image content. Therefore, the set speed R0 is reduced in the case of text content, and the set speed R0 is increased in the case of image content. Also, as for the same image content, the priority is determined to be higher if the user is more interested in the image content, and the set speed R0 is made higher if the priority is higher, for example.

Figure 8:
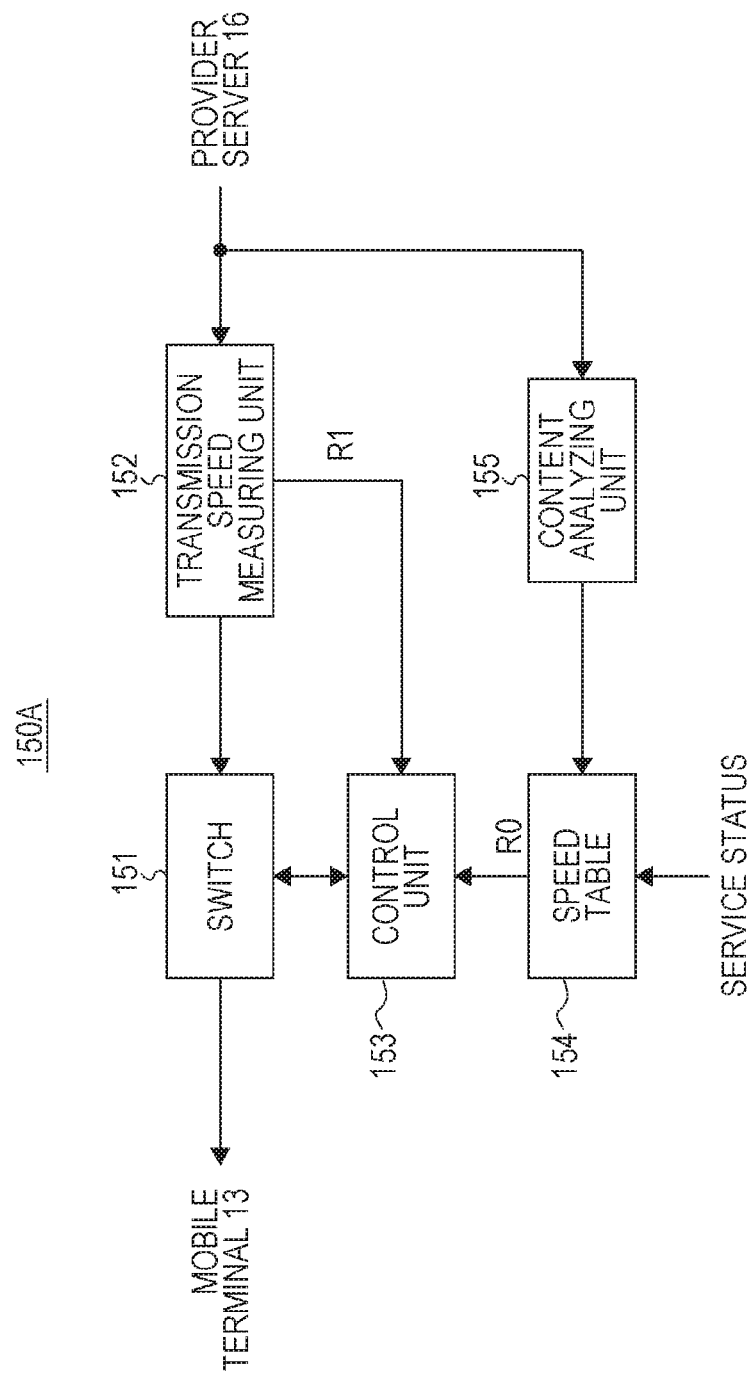
FIG. 8 is a diagram schematically showing an example configuration of a speed control system in a case where a set speed R0 is changed in accordance with the specifics of content (content type, priority, and the like).

FIG. 8 schematically shows an example configuration of a speed control system 150A in a case where the set speed R0 is changed in accordance with the specifics of content (content type, priority, and the like). In FIG. 8, the components equivalent to components shown in FIG. 7 are denoted by the same reference numerals as those used in FIG. 7, and detailed explanation of them is not repeated herein. The speed control system 150A includes a switch 151, a transmission speed measuring unit 152, a control unit 153, a speed table 154, and a content analyzing unit 155.

The content analyzing unit 155 identifies the specifics of content (content type, priority, and the like) by analyzing the content data flowing from the provider server 16 into the mobile terminal 13. The content analyzing unit 155 may identify the content type in accordance with the reference URL on the web page, the MIME format information in the http header, the address information in the http header or the IP header, data size information, or the like. Also, the content analyzing unit 155 may identify the content type in accordance with the extension of the reference URL, such as mp4, av, mov, or jpg.

The content analyzing unit 155 may also identify priority by taking the user's situation into consideration. For example, the user often views entertainment information pages when in a residential area, and often view shop information pages when in a commercial area. Alternatively, the specifics of content (content, type, priority, and the like) may be identified on the side of the mobile terminal 13, and be transmitted to the carrier server 14. In that case, the content analyzing unit 155 becomes unnecessary.

The result of the identification of the specifics of the content is supplied to the speed table 154. The speed table 154 outputs the set speed R0 corresponding to the result of the identification of the content specifics and the service status (the remaining amount in the coupon and the coupon status) (see FIG. 6) to the control unit 153.

The speed control unit 143 may also change the set speed R0 in accordance with the specifics of an action of the user. For example, the specifics of an action of the user are identified based on the user information shown below. Specifically, the user information may be a timetable, a memorandum, a log-in ID, a log-in time, a log-in location, a log-out time, a log-out location, a purchase history, an access history, a history of locations of actions, area information (indicating an industrial area, a commercial area, a residential area, or a transportation facility), or the like.

Figure 9:
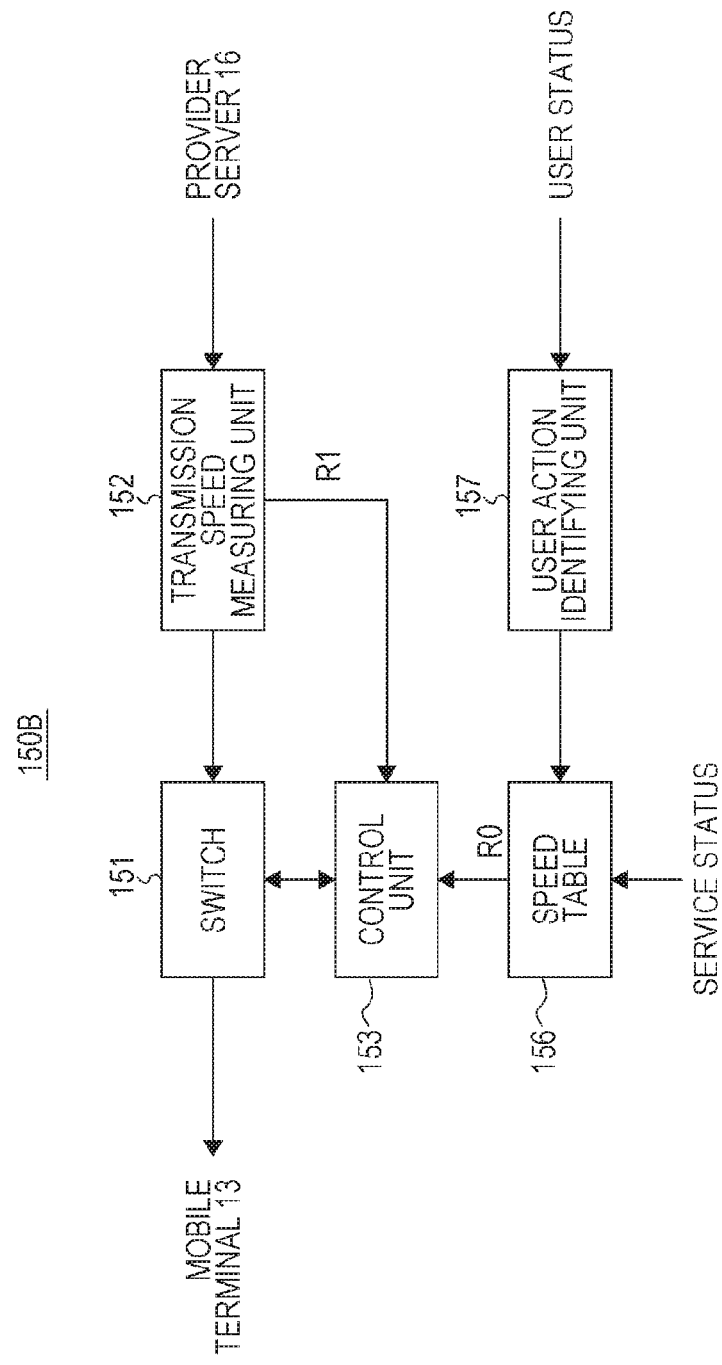
FIG. 9 is a diagram schematically showing an example configuration of a speed control system in a case where the set speed R0 is changed in accordance with the specifics of an action of the user.

FIG. 9 schematically shows an example configuration of a speed control system 150B in a case where the set speed R0 is changed in accordance with the specifics of an action of the user. In FIG. 9, the components equivalent to components shown in FIG. 7 are denoted by the same reference numerals as those used in FIG. 7, and detailed explanation of them is not repeated herein. The speed control system 150B includes a switch 151, a transmission speed measuring unit 152, a control unit 153, a speed table 156, and a user action identifying unit 157.

The user action identifying unit 157 identifies the specifics of an action of the user based on user information. For example, a place (a poor reception area or a good reception area) to which the user is now heading can be identified from a timetable. Also, a check can be made whether the user is located in a place or a time slot in which image content is often viewed, for example.

The result of the identification of the specifics of an action of the user is supplied to the speed table 156. The speed table 156 outputs the set speed R0 corresponding to the result of the identification of the specifics of the action of the user and the service status (the remaining amount in the coupon and the coupon status) (see FIG. 6) to the control unit 153.

Referring back to FIG. 3, the data size control unit 144 reduces the data size of content data to be transmitted from the provider server 16 to the mobile terminal 13 through the base station 12 based on the communication state information received by the information receiving unit 141. In a case where the estimated line speed Ro is equal to or lower than the threshold value Rt, and the communication speed is restricted to 150 kbps, for example, the data size is reduced.

When web content includes an image or a moving image, for example, the data size control unit 144 performs control to reduce the data size by performing a process to reduce the resolution of the image or the moving image, or performing a process to remove the data of the image or the moving image. Also, the data size control unit 144 performs a process to reduce the data size of moving image content or image (still image) content, but does not perform the process on text content or mail, for example. That is, control is performed to reduce the data size in accordance with the viewing specifics.

As the data size is reduced in the above manner, the time required for content data transmission can be shortened, and long occupation of the wireless resource can be prevented even in a case where the communication speed is restricted to a low value.

Figure 10:
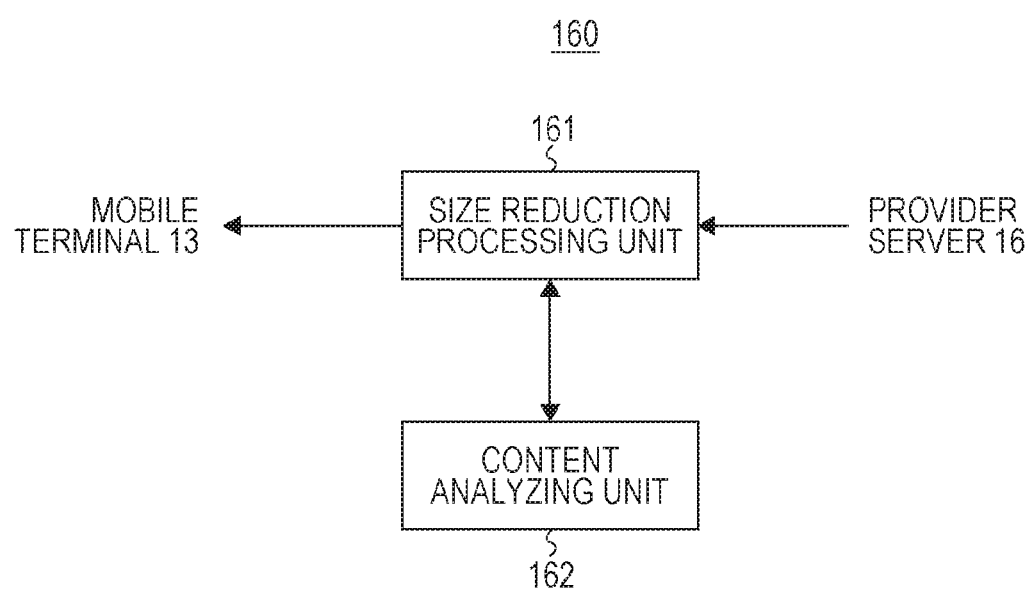
FIG. 10 is a diagram schematically showing an example configuration of a data size control system.

FIG. 10 schematically shows an example configuration of a data size control system 160. The data size control system 160 includes a size reduction processing unit 161 and a content analyzing unit 162. The content analyzing unit 162 identifies the specifics of content (content type, content structure, and the like) by analyzing the content data flowing from the provider server 16 into the mobile terminal 13.

In a case where the communication speed is restricted, the size reduction processing unit 161 performs a size reduction process based on the result of the determination on the content specifics. When web content includes an image or a moving image, for example, a process to reduce the resolution of the image or the moving image is performed, or a process to remove the data of the image or the moving image is performed, so that the data size is reduced.

The data size reduction process may not be performed in the carrier server 14. Instead, communication speed restriction information or a data size reduction request may be sent from the carrier server 14 to the provider server 16, and the data size reduction process may be performed on the side of the provider server 16.

FIG. 11(a) shows an example of web content including an image, a moving image, and the like. When there is no data size reduction request, the provider server 16 sends the web content shown in FIG. 11(a) to the mobile terminal 13, as shown in FIG. 11(b). When there is a data size reduction request, however, the provider server 16 sends the web content minus the image, the moving image, and the like of a large data size, to the mobile terminal 13, as shown in FIG. 11(c).

It should be noted that the provider that runs the provider server 16 and the mobile-phone operator may be the same, or may not be the same. In a case where the provider and the mobile-phone operator are not the same, it is also possible to employ a business model that, when the data size reduction process is performed on the side of the provider server 16 as described above, the mobile-phone operator may pay a reward as a token of gratitude to the provider for solving network congestion.

Figure 12:
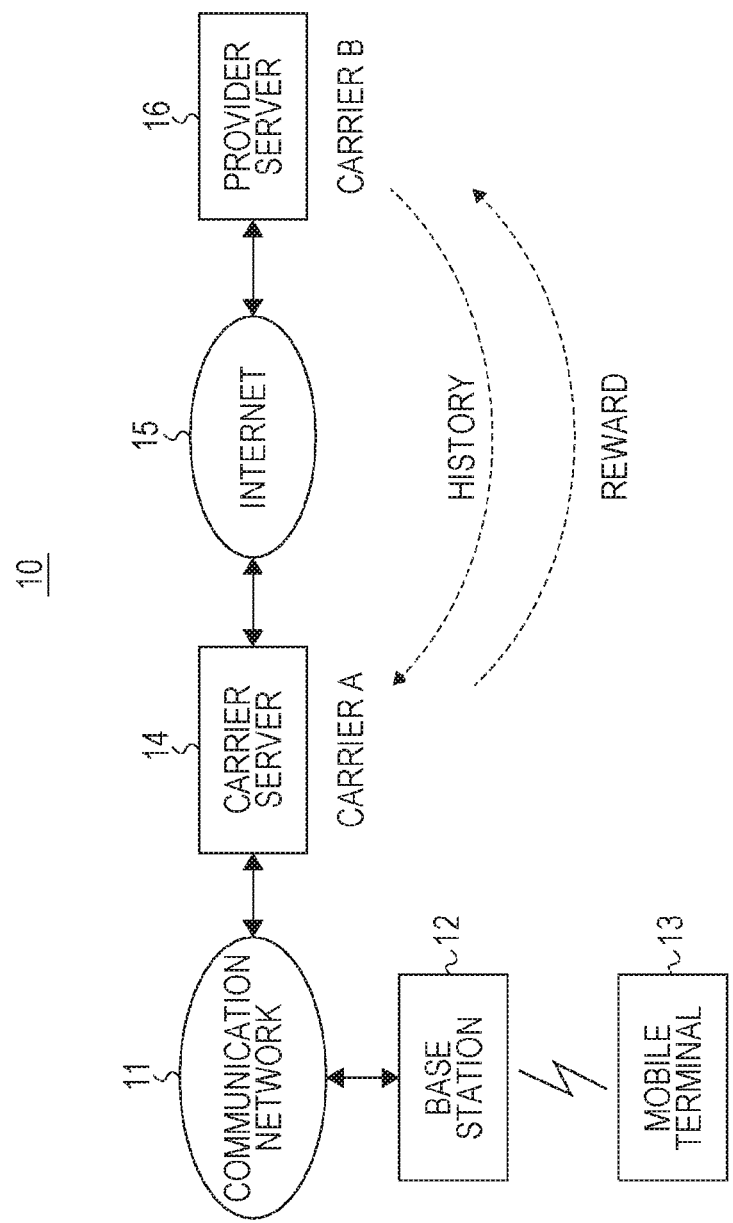
FIG. 12 is a diagram for explaining a business model in which a mobile-phone operator pays a reward to a provider.

FIG. 12 shows an example operation to be performed in such a case. In this case, the provider (carrier B) sends information about the history of the data size reduction process to the mobile-phone operator (carrier A). The mobile-phone operator calculates an amount of reward based on the history information, and pays the reward to the provider. In a case where the data size reduction process is performed on the side of the carrier server 14, a reward may also be paid as a token of gratitude to the provider.

As described above, in the mobile-phone system 10 shown in FIG. 1, the communication state information indicating a state of communication with the base station 12 is acquired by the mobile terminal 13, and this communication state information is transmitted to the carrier server 14 through the base station 12. Based on this communication state information, the carrier server 14 controls the communication speed of content data to be transmitted from the provider server (web server) 16 to the mobile terminal 13 through the base station 12. Accordingly, the communication speed of the content data to be transmitted from the provider server 16 to the mobile terminal 13 through the base station 12 can be set in accordance with the communication state information, for example, and excellent communication can be conducted even in a communication environment with poor line quality. That is, the wireless resource that can be allotted to other users can be increased, and line load can be reduced, for example. Also, the most basic communication environment is provided, so that a more stable system can be established, for example.

Also, in the mobile-phone system 10 shown in FIG. 1, the mobile terminal 13 or the carrier server 14 sets the time-out period related to connection to the provider server 16 or downloading of content data from the provider server 16 based on the communication state information. With this, the time-out period is shortened in an environment with poor line quality, for example, and accordingly, unnecessarily long occupation of the wireless line is prevented. After communication is disrupted due to a time-out, retransmission/reconnection is performed to reacquire information. In this manner, information can be even more quickly acquired in some cases.

Also, in the mobile-phone system 10 shown in FIG. 1, the carrier server 14 changes the control value for the communication speed in accordance with the specifics of content or an action of a user. Accordingly, the mobile terminal 13 can acquire content data from the provider server 16 at the communication speed corresponding to the specifics of the content or the specifics of an action of the user, for example, and conduct relatively smooth communication even when the communication speed is restricted.

Also, in the mobile-phone system 10 shown in FIG. 1, when the communication speed is controlled to drop to a lower value, the carrier server 14 can reduce the size of content data to be transmitted to the mobile terminal 13 through the base station 12. Accordingly, the time required for transmitting content data can be shortened, and long occupation of the wireless resource can be prevented, for example.

Also, in the mobile-phone system 10 shown in FIG. 1, the carrier server 14 puts the coupon into the on-state (usable state) and does not restrict the communication speed when the line quality is good according to the communication state information, but the carrier server 14 puts the coupon into the off-state (unusable state) and restricts the communication speed to a predetermined value when the line quality is not good according to the communication state information. Accordingly, the coupon is automatically put into the unusable state when the communication environment is degraded, for example. Thus, a fee structure that is satisfactory to users can be provided.

2. Modifications

While embodiments of the present technology have been described above with reference to the accompanying drawings, the present technology is not limited to those examples. It is apparent that those who have ordinary skills in the art can make various changes or modifications within the scope of the technical spirit claimed herein, and it should be understood that those changes or modifications are within the scope of the present technology. For example, the mobile terminal has been described as a mobile phone device, but is not necessarily a mobile phone device and may be a portable information processing device such as a PDA, a game machine, or a small-sized PC.

The present technology may also be embodied in the structures described below.

(1) A mobile terminal device including:
an information acquiring unit that acquires communication state information indicating a state of communication with a base station;
an information transmitting unit that transmits the communication state information to a carrier server device through the base station; and
a data receiving unit that receives content data from a web server through the carrier server device and the base station, while a communication speed is controlled based on the communication state information.

(2) The mobile terminal device of (1), wherein the communication state information is an estimated line speed estimated from a congestion degree and an interference wave intensity, and/or line quality information obtained by comparing the estimated line speed with a threshold value.

(3) The mobile terminal device of (1) or (2), further including
a time-out period setting unit that sets a time-out period related to connection to the web server or downloading of the content data from the web server based on the communication state information.

(4) A wireless communication method for a mobile terminal device, including:

an information acquisition step of acquiring communication state information indicating a state of communication with a base station;
an information transmission step of transmitting the communication state information to a carrier server device through the base station; and
a data reception step of receiving content data from a web server through the carrier server device and the base station, while a communication speed is controlled based on the communication state information.

(5) A carrier server device including:
an information receiving unit that receives communication state information from a mobile terminal device through a base station, the communication state information indicating a state of communication with the base station; and
a speed control unit that controls a communication speed of content data based on the communication state information, the content data being transmitted from a web server to the mobile terminal device through the base station.

(6) The carrier server device of (5), wherein the communication state information is an estimated line speed estimated from a congestion degree and an interference wave intensity, and/or line quality information obtained by comparing the estimated line speed with a threshold value.

(7) The carrier server device of (5) or (6), wherein the speed control unit divides the communication state indicated by the communication state information into a plurality of levels, and controls the communication speed in accordance with the respective levels.

(8) The carrier server device of any of (5) through (7), wherein the speed control unit changes a control value for the communication speed in accordance with specifics of content.

(9) The carrier server device of any of (5) through (8), wherein the speed control unit changes a control value for the communication speed in accordance with specifics of an action of a user of the mobile terminal device.

(10) The carrier server device of any of (5) through (9), further including
a data size control unit that reduces size of the content data to be transmitted to the mobile terminal device through the base station, when the speed control unit controls the communication speed to become lower.

(11) The carrier server device of any of (5) through (10), wherein the speed control unit determines whether line quality is good based on the communication state information, sets a coupon into a usable state and does not restrict the communication speed when the line quality is good, and sets the coupon into an unusable state and restricts the communication speed to a predetermined value when the line quality is not good.

(12) A communication speed control method in a carrier server device, including:
an information reception step of receiving communication state information from a mobile terminal device through a base station, the communication state information indicating a state of communication with the base station; and
a speed control step of controlling a communication speed at a time when content data is transmitted from a web server to the mobile terminal device through the base station, the communication speed being controlled based on the communication state information.

REFERENCE SIGNS LIST

10 Mobile-phone system
11 Communication network of telecommunications carrier

12 Base station
13 Mobile terminal
14 Carrier server
15 Internet
16 Provider server (web server)
101 Antenna
102 Wireless interface unit
103 Control unit
104 User interface unit
131 Information acquiring unit
132 Information transmitting unit
133 Data receiving unit
134 Time-out period setting unit
141 Information receiving unit
142 Data transmitting unit
143 Speed control unit
144 Data size control unit
150, 150A, 150B Speed control system
151 Switch
152 Transmission speed measuring unit
153 Control unit
154 Speed table
155 Content analyzing unit
156 Speed table
157 User action identifying unit
160 Data size control system
161 Size reduction processing unit
162 Content analyzing unit

The invention claimed is:

1. A mobile terminal device comprising:
processing circuitry configured to acquire communication state information indicating a state of communication with a base station;
a transmitter configured to transmit the communication state information to a carrier server device through the base station, wherein the communication state information is updated based on a database provided to the mobile terminal device by the carrier server device, wherein the database is provided to the mobile terminal device based on a location of the mobile terminal device and the database is a database of on-line areas, off-line areas, or crowd density information; and
a receiver configured to receive content data from a provider server through the carrier server device and the base station, while a communication speed is controlled based on the communication state information,
wherein the processing circuitry is further configured to receive updated communication speed based on a specific action of the mobile terminal device, wherein the specific action of the mobile terminal device includes a location or a time slot in which a predetermined type of content is often viewed, and
wherein when the updated communication speed corresponds to data size reduction, a data size reduction history is generated, wherein the carrier server device calculates a reward for the provider server based on the data size reduction history.

2. The mobile terminal device according to claim 1, wherein the communication state information is an estimated line speed estimated from a congestion degree and an interference wave intensity, and/or line quality information obtained by comparing the estimated line speed with a threshold value.

3. The mobile terminal device according to claim 1, wherein the processing circuitry is further configured to set a time-out period related to connection to the provider server or downloading of the content data from the provider server based on the communication state information.

4. A wireless communication method for a mobile terminal device, comprising:
an information acquisition step of acquiring communication state information indicating a state of communication with a base station;
an information transmission step of transmitting the communication state information to a carrier server device through the base station, wherein the communication state information is updated based on a database provided to the mobile terminal device by the carrier server device, wherein the database is provided to the mobile terminal device based on a location of the mobile terminal device and the database is a database of on-line areas off-line areas, or crowd density-information; and
a data reception step of receiving content data from a provider server through the carrier server device and the base station, while a communication speed is controlled based on the communication state information,
a further information acquisition step of receiving updated communication speed based on a specific action of the mobile terminal device, wherein the specific action of the mobile terminal device includes a location or a time slot in which a predetermined type of content is often viewed, and
wherein when the updated communication speed corresponds to data size reduction, a data size reduction history is generated, wherein the carrier server device calculates a reward for the provider server based on the data size reduction history.

5. A carrier server device comprising:
a receiver configured to receive communication state information from a mobile terminal device through a base station, the communication state information indicating a state of communication with the base station, wherein the communication state information is updated based on a database provided to the mobile terminal device by the carrier server device, wherein the database is provided to the mobile terminal device based on a location of the mobile terminal device and the database is a database of on-line areas, off-line areas, or crowd density information; and
processing circuitry configured to control a communication speed of content data based on the communication state information, the content data being transmitted from a provider server to the mobile terminal device through the base station,
the processing circuitry further configured to provide updated communication speed based on a specific action of the mobile terminal device, wherein the specific action of the mobile terminal device includes a location or a time slot in which a predetermined type of content is often viewed, and
wherein when the updated communication speed corresponds to data size reduction, a data size reduction history is generated, wherein the processing circuitry calculates a reward for the provider server based on the data size reduction history.

6. The carrier server device according to claim 5, wherein the communication state information is an estimated line speed estimated from a congestion degree and an interference wave intensity, and/or line quality information obtained by comparing the estimated line speed with a threshold value.

7. The carrier server device according to claim 5, wherein the processing circuitry is further configured to
 divide the communication state indicated by the communication state information into a plurality of levels, and
 control the communication speed in accordance with the respective levels.

8. The carrier server device according to claim 5, wherein the processing circuitry is configured to change a control value for the communication speed in accordance with specifics of content.

9. The carrier server device according to claim 5, wherein the processing circuitry is configured to change a control value for the communication speed in accordance with specifics of an action of a user of the mobile terminal device.

10. The carrier server device according to claim 5, wherein the processing circuitry is configured to reduce size of the content data to be transmitted to the mobile terminal device through the base station, when the updated communication speed corresponds to data size reduction.

11. The carrier server device according to claim 5, wherein the processing circuitry is configured to
 determine whether line quality is good based on the communication state information,
 set a coupon into a usable state and not restrict the communication speed when the line quality is good, and
 set the coupon into an unusable state and restrict the communication speed to a predetermined value when the line quality is not good.

12. A communication speed control method in a carrier server device, comprising:
 an information reception step of receiving communication state information from a mobile terminal device through a base station, the communication state information indicating a state of communication with the base station, wherein the communication state information is updated based on a database provided to the mobile terminal device by the carrier server device, wherein the database is provided to the mobile terminal device based on a location of the mobile terminal device and the database is a database of on-line areas, off-line areas, or crowd density information; and
 a speed control step of controlling a communication speed at a time when content data is transmitted from a provider server to the mobile terminal device through the base station, the communication speed being controlled based on the communication state information,
 a communication speed providing step of providing updated communication speed based on a specific action of the mobile terminal device, wherein the specific action of the mobile terminal device includes a location or a time slot in which a predetermined type of content is often viewed, and
 a reward calculating step of, when the updated communication speed corresponds to data size reduction, generating a data size reduction history, wherein a reward is calculated for the provider server based on the data size reduction history.

* * * * *